US009511321B2

(12) United States Patent
Hwang (10) Patent No.: US 9,511,321 B2
(45) Date of Patent: Dec. 6, 2016

(54) ADSORPTION-TYPE AIR DRYING SYSTEM WITH BLOWER NON-PURGE OPERATION USING COMPRESSED HEAT (71) Applicant: Chul Yong Hwang, Yongin-si (KR)

(72) Inventor: Chul Yong Hwang, Yongin-si (KR)

( * ) Notice: Subject to any disclaimer, the term of this patent is extended or adjusted under 35 U.S.C. 154(b) by 0 days.

(21) Appl. No.: 14/443,657

(22) PCT Filed: May 21, 2013

(86) PCT No.: PCT/KR2013/004440
§ 371 (c)(1),
(2) Date: May 19, 2015

(87) PCT Pub. No.: WO2014/077479
PCT Pub. Date: May 22, 2014

(65) Prior Publication Data
US 2015/0290578 A1 Oct. 15, 2015

(30) Foreign Application Priority Data
Nov. 19, 2012 (KR) .................. 10-2012-0130714

(51) Int. Cl.
*F25B 17/00* (2006.01)
*F24F 3/14* (2006.01)
*B01D 53/26* (2006.01)
(Continued)

(52) U.S. Cl.
CPC ......... *B01D 53/261* (2013.01); *B01D 53/0423* (2013.01); *B01D 53/0454* (2013.01);
(Continued)

(58) Field of Classification Search
CPC .......... B01D 53/0423; B01D 53/0454; B01D 53/0462; B01D 53/261; B01D 53/265; B01D 2253/104; B01D 2253/106; B01D 2253/108; B01D 2257/80; B01D 2258/06; B01D 2259/40003; B01D 2259/40054; B01D 2259/4006; B01D 2259/4009; B01D 2259/402; F24F 3/1411; F25B 17/083; Y02B 30/62; Y02B 30/64
USPC ...... 96/115, 121, 126–28, 143, 146; 34/472, 34/473, 80
See application file for complete search history.

(56) References Cited

U.S. PATENT DOCUMENTS 3,359,706 A * 12/1967 Zankey .................. B01D 53/04
95/115
3,950,154 A * 4/1976 Henderson ........... B01D 53/261
96/126
(Continued)

FOREIGN PATENT DOCUMENTS

JP 07-053202 2/1995
JP 09-047630 2/1997
(Continued)

OTHER PUBLICATIONS

International Search Report Dated Aug. 14, 2013 From the Korean Intellectual Property Office Re. Application No. PCT/KR2013/004440 and Its Translation Into English.

*Primary Examiner* — Frank Lawrence (57) ABSTRACT

The present invention relates to an adsorption-type air drying system, of which the object is to simplify the flow paths of the system, reduce the number of the components such as a valve intricately controlled according to the state of operation, and decrease the cost for constructing the system. Furthermore, the object of the present invention is to provide an adsorption-type air drying system which may be used under various pressure conditions, and smoothly operated regardless of the pressure change of the system by way of a structure compensating for the pressure loss generated during non-purge operation.

16 Claims, 8 Drawing Sheets

(51) Int. Cl.
*F25B 17/08* (2006.01)
*B01D 53/04* (2006.01)

(52) U.S. Cl.
CPC ......... *B01D53/0462* (2013.01); *F24F 3/1411* (2013.01); *F25B 17/083* (2013.01); *B01D 53/265* (2013.01); *B01D 2253/104* (2013.01); *B01D 2253/106* (2013.01); *B01D 2253/108* (2013.01); *B01D 2257/80* (2013.01); *B01D 2258/06* (2013.01); *B01D 2259/402* (2013.01); *B01D 2259/40003* (2013.01); *B01D 2259/4006* (2013.01); *B01D 2259/4009* (2013.01); *B01D 2259/40054* (2013.01); *Y02B 30/62* (2013.01); *Y02B 30/64* (2013.01)

(56) References Cited

U.S. PATENT DOCUMENTS

| | | | | |
|---|---|---|---|---|
| 5,271,762 A | * | 12/1993 | Schoofs | B01D 53/261 95/115 |
| 5,534,186 A | * | 7/1996 | Walker | B01D 53/261 252/194 |
| 6,375,722 B1 | * | 4/2002 | Henderson | B01D 53/0454 96/112 |
| 2003/0233941 A1 | * | 12/2003 | Battershell | B01D 53/0454 96/112 |
| 2004/0040172 A1 | * | 3/2004 | Crawford | B01D 53/0454 34/330 |
| 2013/0145779 A1 | * | 6/2013 | Hwang | F24F 3/1411 62/94 |
| 2014/0260967 A1 | * | 9/2014 | Gitschlag | B01D 53/261 95/41 |

FOREIGN PATENT DOCUMENTS

| | | |
|---|---|---|
| JP | 10-024211 | 1/1998 |
| KR | 10-2003-0033687 | 5/2003 |
| KR | 10-2003-0097426 | 12/2003 |
| WO | WO 2014/077479 | 5/2014 |

\* cited by examiner

Fig. 1

PRIOR ART

Fig. 2

PRIOR ART

Fig. 3

PRIOR ART

ADSORPTION-TYPE AIR DRYING SYSTEM WITH BLOWER NON-PURGE OPERATION USING COMPRESSED HEAT

RELATED APPLICATIONS

This application is a National Phase of PCT Patent Application No. PCT/KR2013/004440 having International filing date of May 21, 2013, which claims the benefit of priority of Korean Patent Application No. 10-2012-0130714 filed on Nov. 19, 2012. The contents of the above applications are all incorporated by reference as if fully set forth herein in their entirety.

TECHNICAL FIELD

The present invention relates to an adsorption-type air drying system, and more particularly to an adsorption-type air drying system with a non-purge operation, which simplifies the flow paths, reduces the number of components such as a valve intricately controlled according to the state of operation, and significantly reduces the cost for constructing the system.

BACKGROUND ART

In general, an air drying system removes moisture included in the air. The air drying system is used in a variety of fields throughout the industries, such as various automation equipments, a semiconductor manufacturing process, a production line in a chemical process causing chemical reactions by contact with moisture, etc., all of which require dry air.

The air drying system is divided into a cooling air drying system and an adsorption-type air drying system. The cooling air drying system decreases the temperature of compressed air by using a cooling compressor and condenses the moisture included in the compressed air, thereby removing the moisture in the air. The adsorption-type air drying system adsorbs the moisture included in the air by using an adsorbent, a dehumidifying agent, and a moisture-absorbent.

The adsorption-type air drying system is increasingly used which has an excellent energy efficiency, is easy to install, and is economical in maintenance.

Generally, the adsorption-type air drying system is divided into a heat adsorption-type air drying system and a non-heat adsorption-type air drying system in accordance with a regeneration method of the adsorbent. The heat adsorption-type air drying system regenerates the adsorbent by using a predetermined heat source. The non-heat adsorption-type air drying system regenerates the adsorbent only by air for regeneration.

Also, the heat adsorption-type air drying system is divided into a circulation heat adsorption-type air drying system and a non-circulation heat adsorption-type air drying system. The circulation heat adsorption-type air drying system regenerates the adsorbent by causing a compressor to circulate the compressed air. The non-circulation heat adsorption-type air drying system regenerates the adsorbent by inhaling outside air. Here, the used air is discharged to the outside.

Various examples of the adsorption-type air drying system are disclosed in Korean Patent Nos. 10-0701218, 10-0750190, 10-0793980, and 10-0976553.

Figure 1:
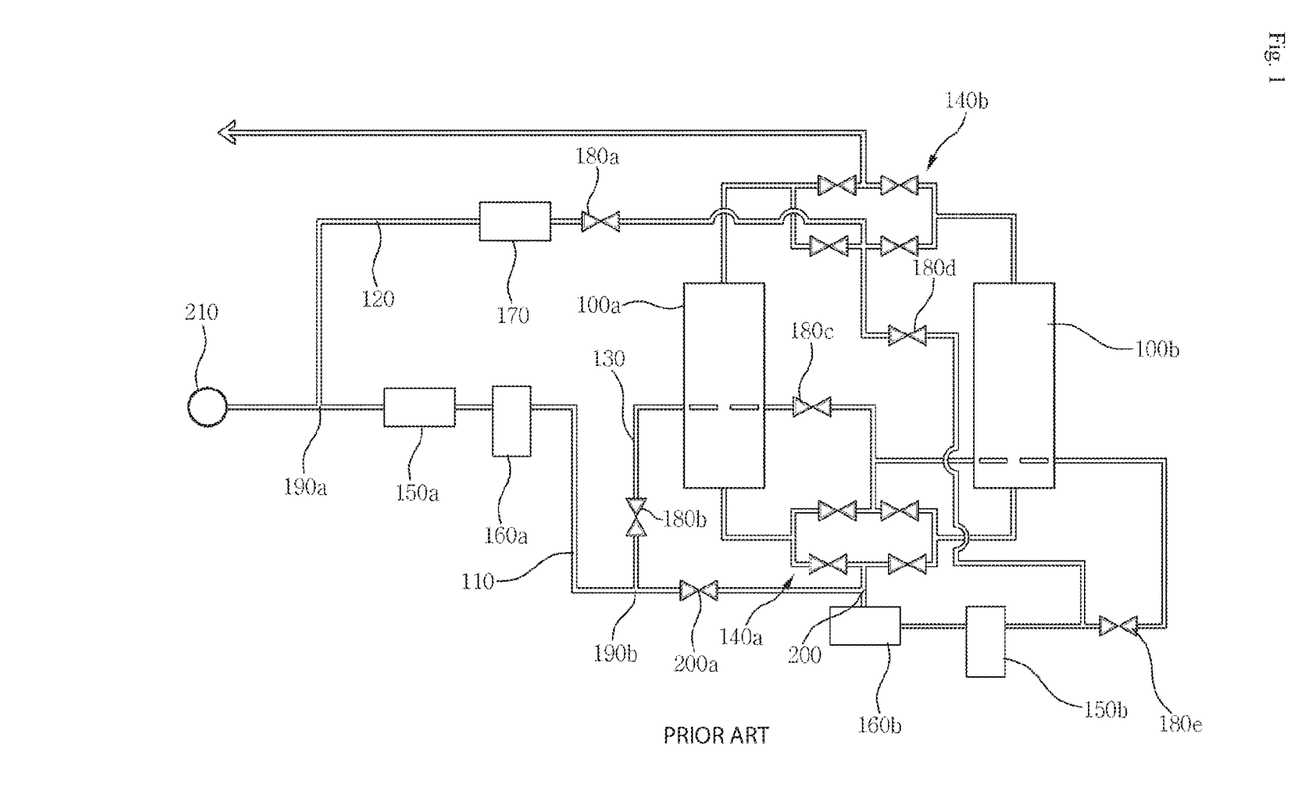
FIG. 1 is a schematic view showing a conventional adsorption-type air drying system.
Figure 2:
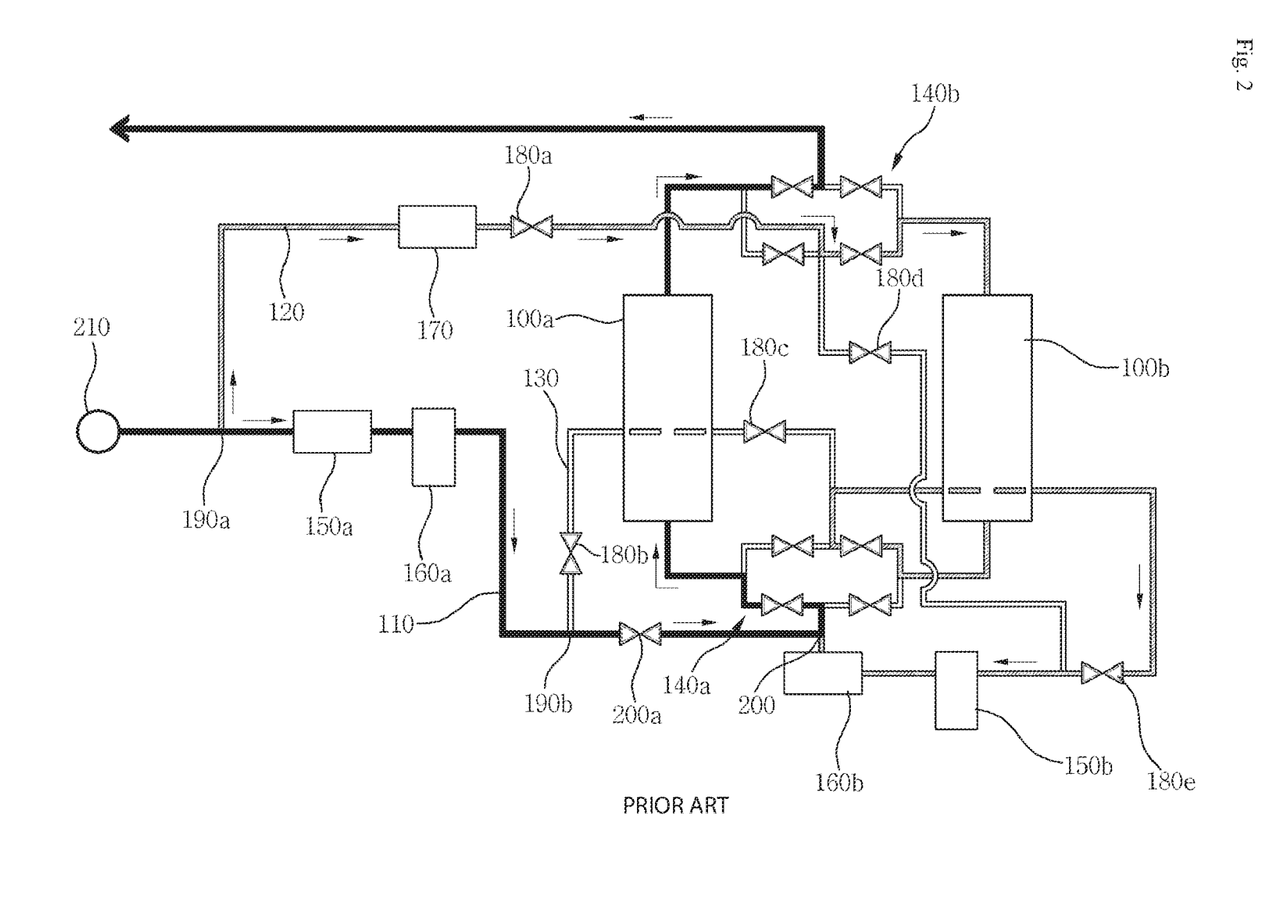
FIG. 2 is a schematic view showing an air flow during generation and regeneration operations in the conventional adsorption-type air drying system.
Figure 3:
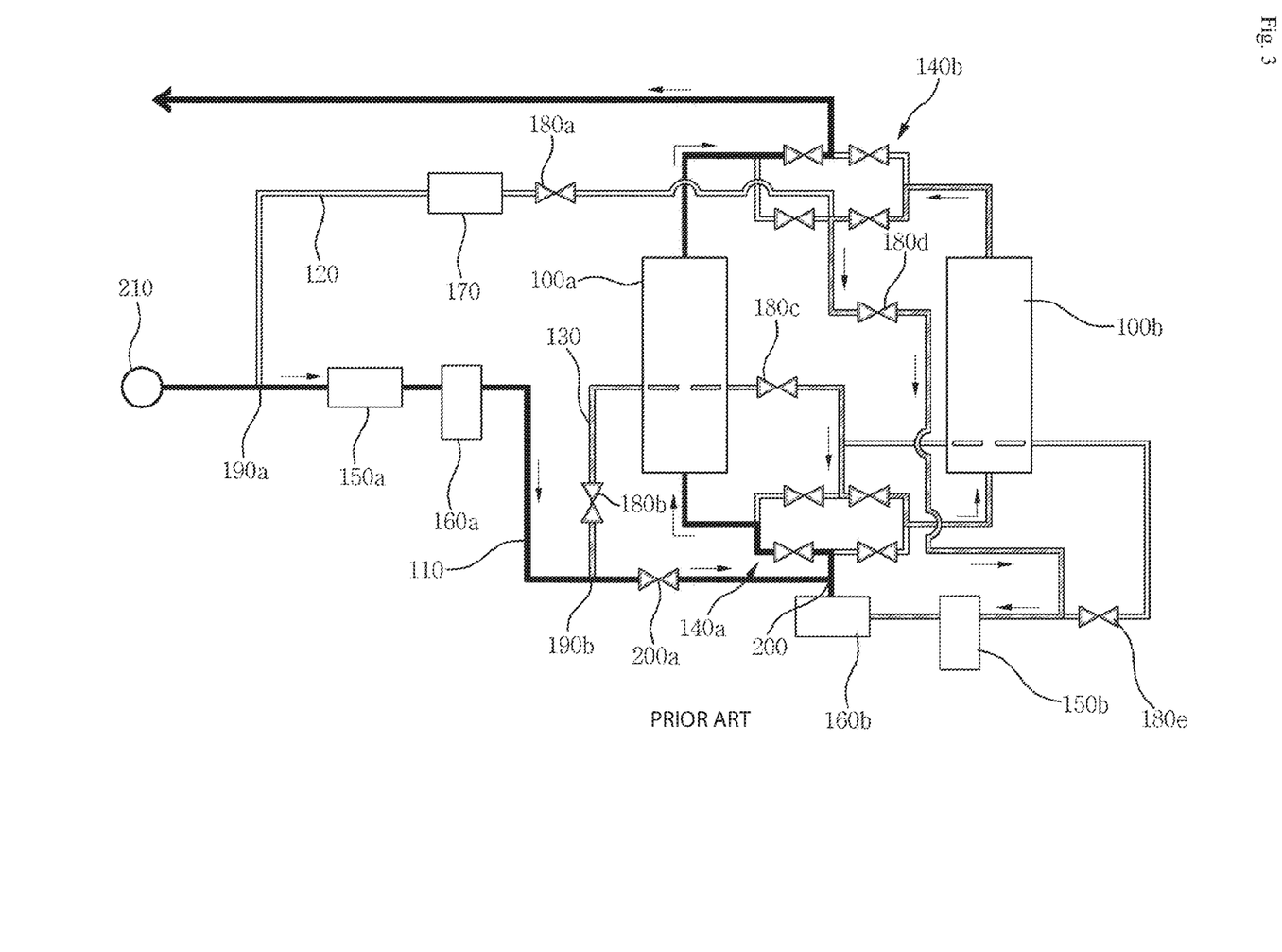
FIG. 3 is a schematic view showing an air flow during generation and cooling operations in the conventional adsorption-type air drying system.

For example, FIGS. 1 to 3 show a conventional representative adsorption-type air drying system.

As shown in FIG. 1, the adsorption-type air drying system includes two towers 100a and 100b in which the adsorbent is built; a generation line 110 for generating dry air; a regeneration line 120 for regenerating the tower; a cooling line 130 for cooling the tower; valve devices 140a and 140b which are installed in generation line 110, the regeneration line 120 and the cooling line 130 and convert the air flow; coolers 150a and 150b and separators 160a and 160b which are installed in the generation line 110 and the regeneration line 120 respectively and cool the air and separate the moisture; a heater 170 which is installed in the regeneration line 120 and heats the air; and a plurality of valves 180a to 180e which are installed in the lines respectively and control the air.

Here, an undescribed reference number 210 represents the compressor which provides the compressed air.

A process in which a generation operation and regeneration heating operation/regeneration cooling operation are formed in the adsorption-type air drying system which is configured as described above will be described as follows.

The generation operation is to generate the dry air by adsorbing the moisture in the air. The regeneration heating operation is to heat and provide the air to the tower and to separate the moisture adsorbed in the adsorbent in the tower, so that the adsorbent is regenerated. The regeneration cooling operation is to cool the tower which has been overheated after the regeneration.

The generation operation and regeneration heating operation/regeneration cooling operation are simultaneously performed in the two towers. For example, the regeneration heating operation/regeneration cooling operation are sequentially performed in a second tower during the generation operation in a first tower. Reversely, the regeneration heating operation/regeneration cooling operation are sequentially performed in the first tower during the generation operation in the second tower.

As shown in FIG. 2, first, the compressed air which is supplied by the compressor 210 is branched off at a first branch point 190a, and then about 70% of the compressed air flows through the generation line 110 and the remaining about 30% of the compressed air flows through the regeneration line 120.

Here, the flow rate distribution of the compressed air at the first branch point 190a can be controlled by a flow rate control valve or an orifice, etc.

Next, the air flowing through the generation line 110 is cooled by the first cooler 150a and the moisture in the air is separated through the first separator 160a. Then, the air passes through a junction 200 and is introduced into the first tower 100a through the first valve device 140a.

The moisture in the air introduced into the first tower 100a is removed in the first tower 100a. Then, the dry air where the moisture has been removed passes through the second valve device 140b, and then is transferred to the process.

Simultaneously with this, 30% of the compressed air branched off at the first branch point 190a flows through the regeneration line 120 at a temperature of 80 to 170° C. The air flowing through the regeneration line 120 is heated at a predetermined temperature required for the regeneration, for example, 120 to 250° C. by the heater 170, and then is introduced into the second tower 100b through the second valve device 140b.

Then, the adsorbent is regenerated by the high temperature air introduced into the second tower 100b.

At this time, the air flows from the top to the bottom of the second tower 100b (top-down approach).

Continuously, the regenerated and heated air passes sequentially through the first valve device 140a, the second cooler 150b and the second separator 160b and is joined at the junction 200 to the air flowing through the generation line 110, and then is transferred to the first tower 100a. Then, a drying process is performed on the air.

Meanwhile, after the adsorbent is regenerated, a process of cooling the overheated tower is immediately performed after the regeneration.

For this, as shown in FIG. 3, while the compressed air which is supplied by the compressor 210 flows through the generation line 110, the compressed air is cooled by the first cooler 150a and the moisture in the compressed air is separated by the first separator 160a. Then, the compressed air is branched off at a second branch point 190b and about 70% of the air decompressed by the flow rate control valve 200a continues to flow through the generation line 110 and the remaining about 30% of the air flows through the cooling line 130.

In FIG. 3, a reference numeral 180b represents the flow rate control valve installed in the cooling line 130.

Next, the air flowing through the generation line 110 passes through the junction 200 and is introduced into the first tower 100a through the first valve device 140a. The moisture in the air introduced into the first tower 100a is removed in the first tower 100a, and then the dry air where the moisture has been removed passes through the second valve device 140b and is transferred to the process.

Simultaneously with this, the air flowing through the cooling line 130 passes through the first valve device 140a and is introduced into the second tower 100b. The second tower 100b is cooled by the air introduced into the second tower 100b.

At this time, the air flows from the bottom to the top of the second tower 100b (bottom-up approach).

Next, the cooled air passes sequentially through the second valve device 140b, the second cooler 150b and the second separator 160b and is joined at the junction 200 to the air flowing through the generation line 110, and then is transferred to the first tower 100a. Then, the drying process is performed on the air.

Here, the foregoing has described an example of the operation state in which the dry air is generated in the first tower, and at the same time, the regeneration heating operation and regeneration cooling operation are performed in the second tower. It can be also considered that the operation is also performed by interchanging the functions of the first and second towers through the opening and closing state of the valves, flow path change, and air flow path change due to them.

That is, through the tower change, the dry air is generated in the second tower, and at the same time, the regeneration heating operation/regeneration cooling operation are performed in the first tower. The generation operation and the regeneration heating operation/regeneration cooling operation are interchanged and alternately performed in the two towers.

However, the above-described conventional adsorption-type air drying system has the following problems.

The air flow is formed in the top-down approach in the regeneration heating operation, and the air flow is formed in the bottom-up approach in the regeneration cooling operation. Therefore, the flow path of the entire system is configured in a complicated manner and the number of components for controlling the air flow, such as a valve, etc., is increased.

Also, too many components to be controlled, such as a valve, etc., require intricate control and the operating pressure condition of the system is limited (the operating pressure of a typical non-purge operation system is 6 to 7 bar). Therefore, the conventional adsorption-type air drying system is difficult to use under various pressure conditions and is difficult to smoothly operate when the pressure change of the system occurs.

SUMMARY OF THE INVENTION

Technical Problem

Therefore, the present invention is designed to solve the above-mentioned problems. The objective of the present invention is to provide the adsorption-type air drying system with a non-purge operation, which simplifies the flow paths, reduces the number of components such as a valve intricately controlled according to the state of operation, and remarkably reduces the cost for constructing the system and cost for maintaining the system.

Also, the objective of the present invention is to provide the adsorption-type air drying system which can be used under various pressure conditions and can be smoothly operated regardless of the pressure change of the system by means of a structure compensating for the pressure loss generated during the non-purge operation.

Technical Solution

The present invention is designed to accomplish the above objective. The present invention provides an adsorption-type air drying system with a non-purge operation using compressed heat. The system includes: a first tower and a second tower in which an adsorbent is built; a main line for supplying compressed air supplied from a compressor to each of the towers; a regeneration line which is branched off from the main line and in which the compressed air for regenerating the adsorbent by each of the towers is distributed and flows; a first connection line which is for air inlet/outlet allowing the air to pass through the first tower and is connected to one and the other sides of the first tower; a second connection line which is for air inlet/outlet allowing the air to pass through the second tower and is connected to one and the other sides of the second tower; a discharge line through which dry air where moisture has been adsorbed by the adsorbent in the tower is discharged; a junction line which is connected to the main line and causes the air which has passed through an adsorbent regeneration operation or a tower cooling operation in the tower where the adsorbent has been regenerated to be joined to the main line; a pressure-increase line which is branched off from the discharge line and is connected to the regeneration line; a blower which is installed on the pressure-increase line and forcibly transmits the dry air of the discharge line to the regeneration line; a 4-way valve 1 for selectively connecting the main line, the first connection line and the second connection line which are connected to one side of each of the towers, and the junction line; and a 4-way valve 2 for selectively connecting the first connection line and the second connection line which are connected to the other side of each of the towers, the regeneration line, and the discharge line.

Here, a heater which heats the compressed air for regenerating the adsorbent is installed on the regeneration line.

The compressed air which flows through the regeneration line and the dry air which is forcibly transmitted to the regeneration line through the pressure-increase line are sequentially supplied through the 4-way valve 2 to the tower where the regeneration operation is performed, so that the adsorbent regeneration heating operation and the tower cooling operation are sequentially performed in the tower.

The main line and the discharge line are connected to air inlet/outlet connection lines of one of the first tower and the second tower by the 4-way valve 1 and the 4-way valve 2, and the junction line and the regeneration line are connected to air inlet/outlet connection lines of the other of the first tower and the second tower by the 4-way valve 1 and the 4-way valve 2, so that the dry air is generated in one of the two towers and the adsorbent regeneration heating operation and the tower cooling operation are performed in the other tower.

The first connection line and the second connection line which are connected to the bottom of each of the towers are selectively connected to the main line and the junction line by the 4-way valve 1, and the first connection line and the second connection line which are connected to the top of each of the towers are selectively connected to the regeneration line and the discharge line by the 4-way valve 2, so that when the dry air is generated, the air flow is performed in a bottom-up approach in the tower, and when the adsorbent regeneration heating operation and the tower cooling operation are performed, the air flow is performed in a top-down approach in the tower.

Advantageous Effects

Accordingly, the adsorption-type air drying system according to the embodiment of the present invention has the following advantages.

1) The adsorption-type air drying system according to the embodiment of the present invention can simplify the flow paths, reduce the number of components such as a valve intricately controlled according to the state of operation, and remarkably reduce the cost for constructing the system and cost for maintaining the system.

2) The adsorption-type air drying system according to the embodiment of the present invention compensates for the pressure loss generated during the non-purge operation by means of a blower (increasing the pressure), so that it can be smoothly operated regardless of the pressure change of the system.

3) The adsorption-type air drying system according to the embodiment of the present invention uses the high temperature air which is supplied from the compressor during the regeneration heating operation. Therefore, the capacity of the heater can be reduced and required power can be reduced.

4) The non-purge operation can be applied under the various pressure conditions from a low pressure to a high pressure. The branched gas is not purged after regeneration (that is, is not discharged to the air). Accordingly, this is more efficient and economical in terms of productivity.

DESCRIPTION OF SPECIFIC EMBODIMENTS OF THE INVENTION

Hereafter, an embodiment of the present invention will be described in detail with reference to the accompanying drawings such that those skilled in the art can easily carry out the embodiment.

Figure 4:
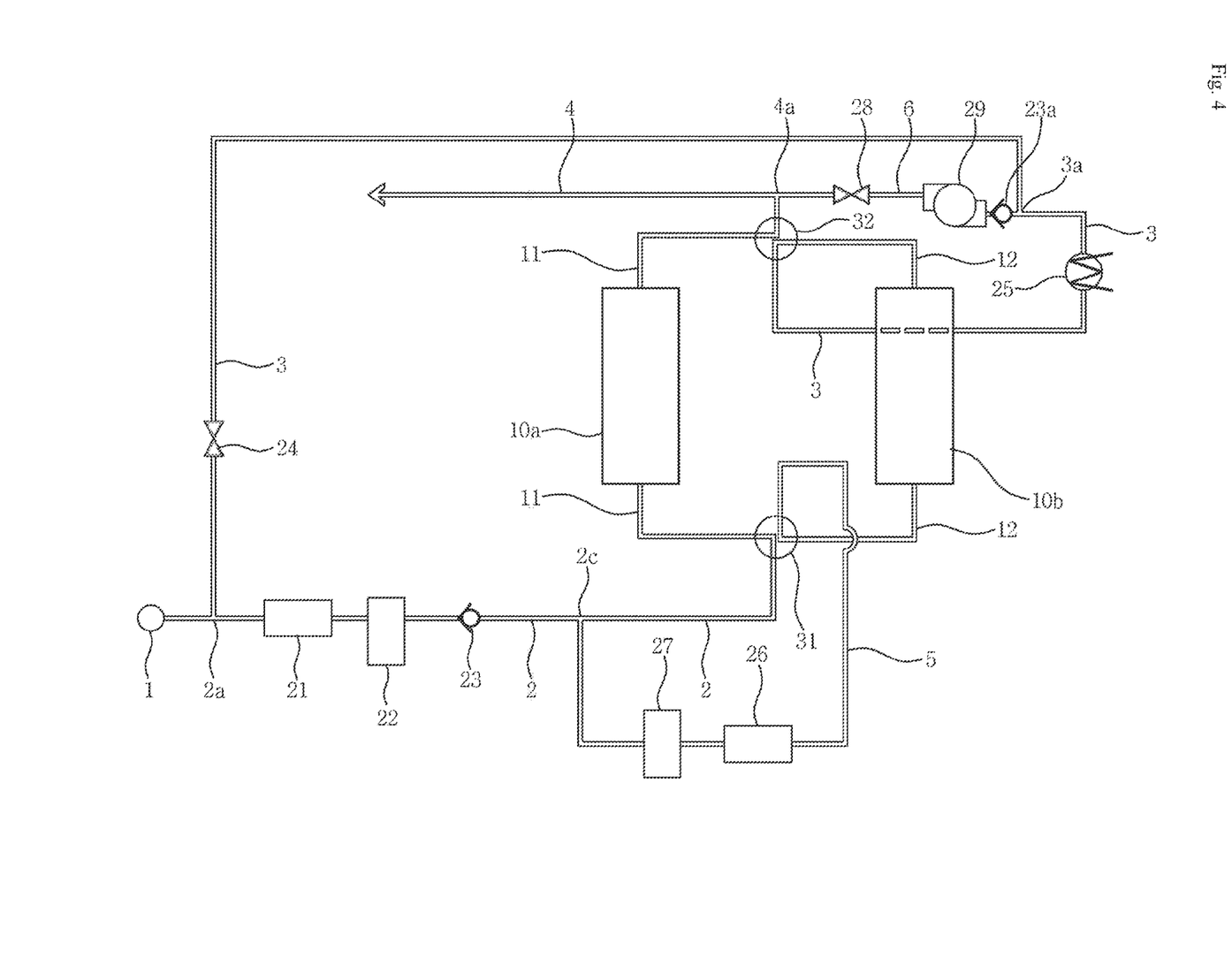
FIG. 4 is a schematic view showing an adsorption-type air drying system according to an embodiment of the present invention.

FIG. 4 is a schematic view showing an adsorption-type air drying system with a blower non-purge operation according to the embodiment of the present invention.

The adsorption-type air drying system according to the embodiment of the present invention has not only a heating operation in which heated air is supplied to a tower and is used for regenerating an adsorbent, but also a non-purge operation in which branched gas is used in a regeneration heating operation or a cooling operation, and then is used for generating dry air.

Also, the adsorption-type air drying system according to the embodiment of the present invention includes a system in which compression heat of air which is supplied by a compressor 1 in the regeneration heating operation is used and the remaining heat for the regeneration is supplemented by using a heater 25. The adsorption-type air drying system according to the embodiment of the present invention includes a blower 29 capable of compensating for the pressure loss generated during the non-purge operation.

Describing in detail, first, the system includes a first tower 10a and a second tower 10b where a predetermined adsorbent such as silica gel, activated alumina, molecular sieve, etc., is charged, the compressor 1 which supplies compressed air to each of the towers 10a and 10b, and two 4-way valves 31 and 32 which set an air flow path.

Like the conventional adsorption-type air drying system, the tower change is made between the first tower 10a and the second tower 10b such that the operation state is interchanged between a generation tower and a regeneration tower. Hereafter, it is clearly stated that the generation tower refers to a tower which is in an operation state where the moisture in the air passing through the tower is adsorbed by using the adsorbent, and thus, dry air is generated, and the regeneration tower refers to a tower which is in an operation state where the regeneration heating operation (moisture separation from the adsorbent and adsorbent regeneration) and the regeneration cooling operation (tower cooling) are performed.

A screw-type compressor or a turbo compressor may be used as the compressor 1. Through this, it is possible to supply the compressed air with a high temperature of 90 to 120° C.

Also, the system according to the embodiment of the present invention includes a main line 2 for supplying the compressed air supplied from the compressor 1 to each of the towers 10a and 10b, a regeneration line 3 which is branched off from the main line 2 and in which the compressed air for regenerating the adsorbent by each of the towers 10a and 10b is distributed and flows, a first and a second connection lines 11 and 12 which are for air inlet/outlet allowing the air to pass through each tower and are connected to one and the other sides of the towers 10a and 10b respectively, a discharge line 4 through which the final dry air which has passed through a drying process in the towers 10a and 10b is discharged, a junction line 5 which causes the air which has passed through the regeneration heating operation (moisture separation from the adsorbent and adsorbent regeneration) and the regeneration cooling operation (tower cooling) in the towers 10a and 10b where the adsorbent is regenerated to be joined to the main line 2, and a pressure-increase line 6 which is branched off from the discharge line 4 and is connected to regeneration line 3.

The main line 2 extends from the compressor 1 and is connected to the below-described 4-way valve 1 (31). A first cooler 21 for cooling the air, a first separator 22 for separating the moisture included in the air, and a check valve 23 for preventing reverse flow are sequentially installed on the main line 2.

Here, the first cooler 21 cools the compressed air which is supplied by the compressor 1. The compressed air with a high temperature and a high pressure, which is supplied to the tower (generation tower) through the main line 2 is cooled within a predetermined temperature range, for example, at a temperature lower than about 40° C. by the first cooler 21.

The first separator 22 separates and removes the moisture in the air which has been cooled and condensed by the first cooler 21. The air where the moisture has been primarily removed is supplied to the generation tower by the first separator 22. A cyclone type separator or a demister-added cyclone type separator may be used as the first separator 22.

Also, the regeneration line 3 is branched off from a first branch point 2a formed at the upstream of the first cooler 21 on the main line 2. The regeneration line 3 extends from the main line 2 and is connected to the 4-way valve 2 (32).

The regeneration line 3 is a heating line through which the compressed air supplied by the compressor 1, that is, the air with compression heat flows.

A first valve 24 and the heater 25 are installed on the regeneration line 3. The first valve 24 controls the flow of the compressed air. The heater 25 which heats the compressed air to be supplied to the regeneration tower is installed at a position adjacent to the rear end of the regeneration line 3, which is connected to the 4-way valve 2 (32).

The heater 25 is an auxiliary air heating means which additionally increases the temperature of the air to be used for the regeneration to a target temperature. The heater 25 supplies necessary heat other than the heat (compression heat) of the air compressed by the compressor 1. When the heater 25 is in an on-state, the temperature of air passing through the heater 25 rises to about 120 to 250° C. and then the air is transferred to the tower where the regeneration is performed.

Of course, during the adsorbent regeneration heating operation, the heater 25 is maintained in the on-state and heats the compressed air. During the tower cooling operation, the heater 25 is controlled to be in an off-state.

Meanwhile, the first connection line 11 on one side of the first tower 10a and the second connection line 12 on one side of the second tower 10b are connected to the 4-way valve 1 (31) to which the main line 2 is connected. The first and second connection lines 11 and 12 are for air inlet/outlet of the towers 10a and 10b respectively. The first connection line 11 is an air inlet/outlet line which is connected to one and the other sides of the first tower 10a. The second connection line 12 is an air inlet/outlet which is connected to one and the other sides of the second tower 10b.

Here, since the first and second connection lines 11 and 12 on the other sides of the towers are connected to the 4-way valve 2 (32), the connection lines 11 and 12 form a flow path structure which connects the 4-way valve 1 (31) with the 4-way valve 2 (32) such that the towers 10a and 10b are placed between the 4-way valve 1 (31) and the 4-way valve 2 (32).

Consequently, the main line 2, the first connection line 11, and the second connection line 12 are connected to the 4-way valve 1 (31), so that these lines form three flow paths around the 4-way valve 1 (31). The first connection line 11 and the second connection line 12 on the other sides of the towers 10a and 10b are connected separately to the 4-way valve 2 (32), so that these connection lines form two flow paths around the 4-way valve 2 (32).

In this flow path structure, when the first tower 10a is used as a tower for generating the dry air, the compressed air is supplied to the first tower 10a through the upstream first connection line 11 with respect to the first tower 10a. Reversely, the dry air where the moisture has been removed by the adsorbent during passing through the first tower 10a is discharged through the downstream first connection line 11.

Simultaneously with this, since the regeneration operation, i.e., the regeneration heating operation and the regeneration cooling operation are sequentially performed in the second tower 10b which is used as the regeneration tower, the air for the adsorbent regeneration heating (high temperature compressed air additionally heated by the heater of the regeneration line) is supplied to the second tower 10b through the upstream second connection line 12 with respect to the second tower 10b (in the regeneration heating operation). Also, the air for cooling the tower (dry air which is supplied by the below-described blower of the pressure-increase line) is supplied to the second tower 10b through the upstream second connection line 12 with respect to the second tower 10b (in the regeneration cooling operation).

Contrary to this, when the second tower 10b is used as a tower for generating the dry air, the compressed air is supplied to the second tower 10b through the upstream second connection line 12 with respect to the second tower 10b. Reversely, the dry air where the moisture has been removed by the adsorbent during passing through the second tower 10b is discharged through the downstream second connection line 12.

Simultaneously with this, the air for the adsorbent regeneration heating (high temperature compressed air additionally heated by the heater of the regeneration line) is supplied to the first tower 10a through the upstream first connection line 11 with respect to the first tower 10a which is used as the regeneration tower, (in the regeneration heating operation). Also, the air for cooling the tower (dry air which is supplied by the below-described blower of the pressure-increase line) is supplied to the first tower 10*a* through the upstream first connection line 11 with respect to the first tower 10*a* (in the regeneration cooling operation).

The junction line 5 which is connected to the main line 2 is additionally connected to the 4-way valve 1 (31), so that the junction line 5 forms remaining one flow path of the 4-way valve 1 (31). The junction line 5 connects the 4-way valve 1 (31) with the main line 2.

Consequently, the total of four lines including the main line 2, the first and second connection lines 11 and 12, and the junction line 5 are connected to the 4-way valve 1 (31). The 4-way valve 1 (31) is a flow control valve which sets and selectively changes the air flow path among the four lines.

The embodiment shown in FIG. 4 shows that the main line 2, the junction line 5, and the first and second connection lines 11 and 12 connected to the bottoms of the towers 10*a* and 10*b* respectively are connected to the 4-way valve 1 (31).

The junction line 5 causes the air which is discharged after the regeneration heating operation or the regeneration cooling operation is completed in the tower (regeneration tower) where the adsorbent is regenerated to be joined to the main line 2 in order to use the air in the generation of the dry air. The junction line 5 is connected to a junction 2*c* of the main line 2, which is set between the rear end of the check valve 23 and the front end of the 4-way valve 1 (31).

Here, components for changing the state of the air which is discharged from the regeneration tower, that is to say, a second cooler 26 which cools the high temperature and high humidity air discharged from the regeneration tower and condenses the moisture, and a second separator 27 for separating and removing the moisture included in the air are installed on the junction line 5.

Also, the discharge line 4 through which the final dry air which has passed through the drying process in the generation tower is discharged is connected to the 4-way valve 2 (32). The dry air which is discharged through the discharge line 4 is transferred to demands, i.e., various automation equipments, a semiconductor manufacturing process, a production line in a chemical process, etc., and is used.

Consequently, the total of four lines including the discharge line 4, the first and second connection lines 11 and 12, and the regeneration line 3 are connected to the 4-way valve 2 (32). The 4-way valve 2 (32) is a flow control valve which sets and selectively changes the air flow path among the four lines.

The embodiment shown in FIG. 4 shows that the discharge line 4, the first and second connection lines 11 and 12 connected to the tops of the towers 10*a* and 10*b* respectively, and the regeneration line 3 are connected to the 4-way valve 2 (32).

Also, the pressure-increase line 6 connecting the discharge line 4 with the regeneration line 3 is provided. A second valve 28 for controlling the flow of the air, and the blower 29 for forcibly transmitting the dry air of the discharge line 4 to the regeneration line 3 in a state where the second valve 28 is in an open-state are installed on the pressure-increase line 6.

In FIG. 4, a reference number 23*a* represents a check valve which is installed at the outlet of the blower 29 from the pressure-increase line 6.

The pressure-increase line 6 is installed to connect a second branch point 4*a* positioned on the discharge line 4 with a connection point 3*a* positioned on the regeneration line 3. The connection point 3*a* may be positioned at the front end (upstream) or rear end (downstream) of the heater 25 on the regeneration line 3.

The pressure-increase line 6 supplies the air to be used in the cooling operation to the regeneration tower (tower requiring to be cooled after the regeneration heating operation is completed) through the regeneration line 3. The air to be used for cooling the regeneration tower in the embodiment of the present invention is the dry air discharged from the generation tower.

In other words, a portion of the dry air which is discharged from the generation tower and then is discharged to the discharge line 4 through the 4-way valve 2 (32) is forcibly transmitted from the discharge line 4 to the regeneration line 3 by the operation of the blower 29, so that the dry air supplied to the regeneration line 3 passes through the 4-way valve 2 (32) and is supplied to the regeneration tower (the first tower or the second tower) through the first connection line 11 or the second connection line 12. Here, the dry air supplied at this point of time cools the regeneration tower.

As such, the air used for cooling the regeneration tower, i.e., the first tower 10*a* or the second tower 10*b* is, as described above, discharged from the corresponding tower through the downstream first connection line 11 or the downstream second connection line 12 (the connection line connected to the bottom of each of the towers) and is transferred to the junction line 5 by the 4-way valve 1 (31), and then is joined again to the main line 2 and is used for generating the dry air in the generation tower.

In the conventional system, the pressure is decreased by the flow rate control valve. However, in the embodiment of the present invention, the pressure is changed and the pressure of the air at the outlet is increased by using the pressure-increase blower 29.

As such, the configuration of the adsorption-type air drying system according to the embodiment of the present invention has been described. The operation state of the adsorption-type air drying system configured as described above will be described as follows.

Figure 5:
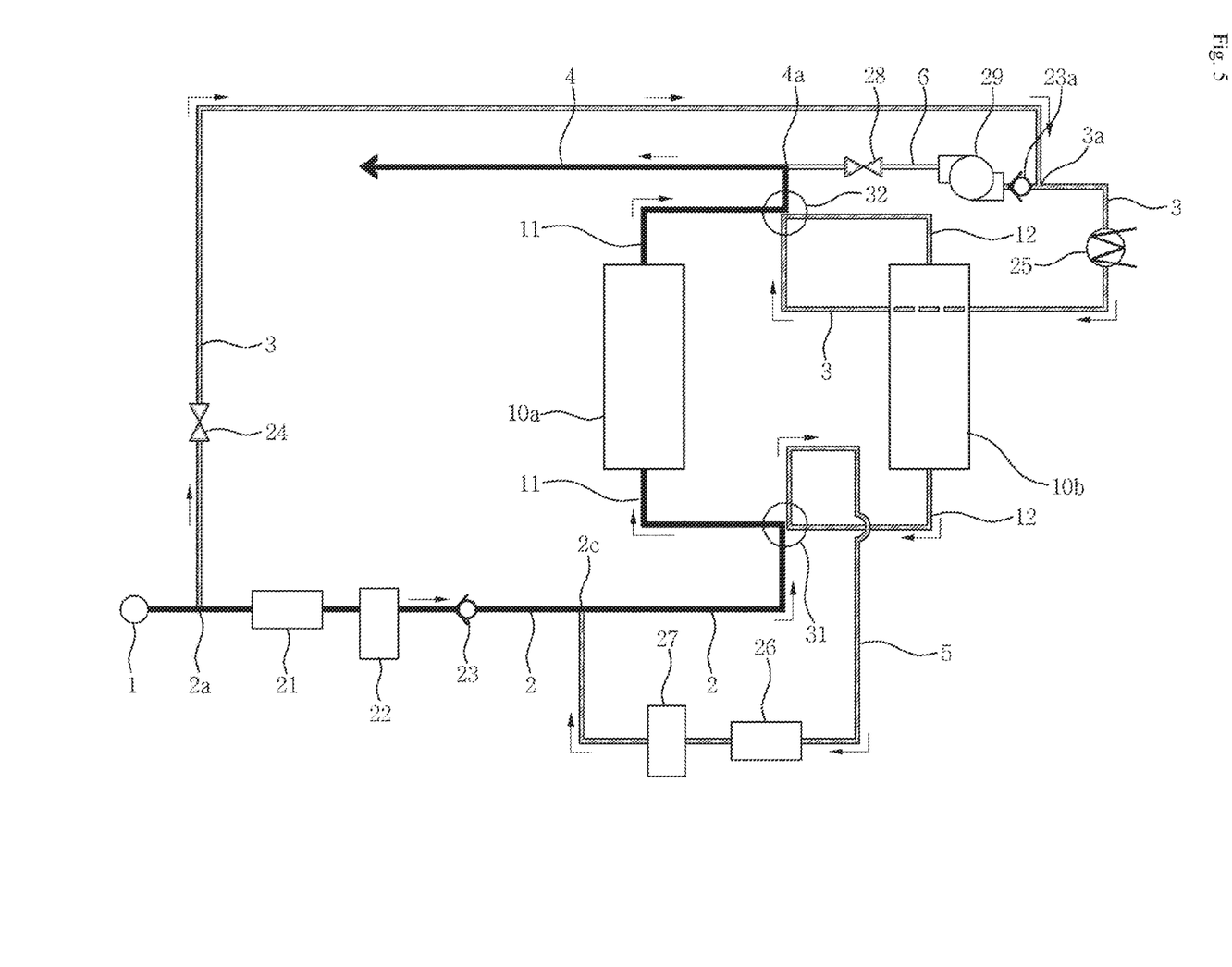
FIG. 5 is a view showing an operation state in which dry air is generated in a first tower, and at the same time, a regeneration heating operation is performed in a second tower in the system according to the embodiment of the present invention.
Figure 6:
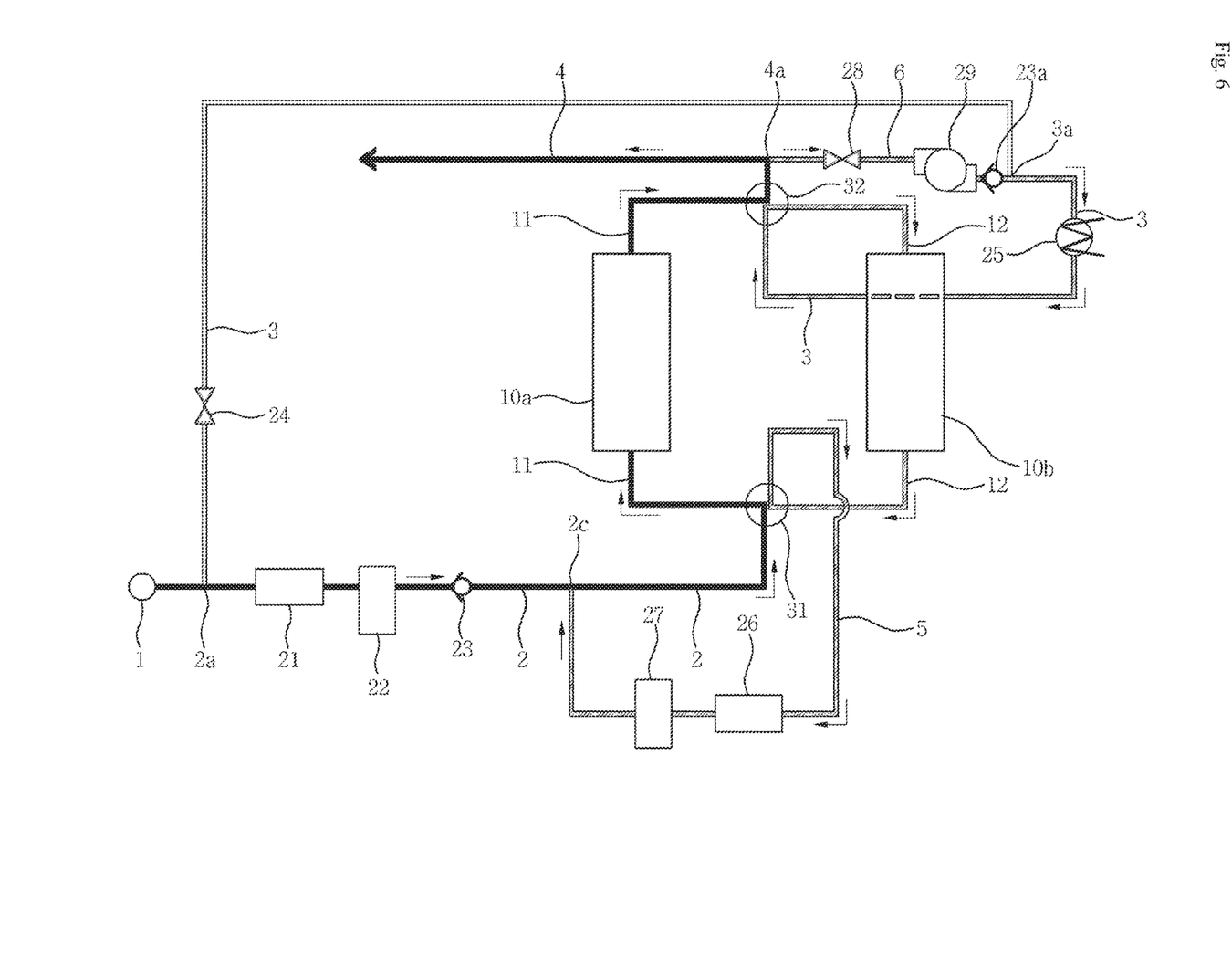
FIG. 6 is a view showing an operation state in which the dry air is generated in the first tower, and at the same time, a cooling operation is performed in the second tower in the system according to the embodiment of the present invention.

FIG. 5 is a view showing the operation state in which dry air is generated in the first tower 10*a*, and at the same time, the adsorbent regeneration heating operation is performed in the second tower 10*b*. FIG. 6 is a view showing the operation state in which the dry air is generated in the first tower 10*a*, and at the same time, the cooling operation is performed in the second tower.

As shown, while the dry air is generated in the first tower 10*a*, the moisture is separated from the adsorbent and the adsorbent is regenerated through the regeneration heating operation. Subsequently, in a state where the temperature of the second tower 10*b* rises above a certain temperature, the second tower 10*b* is cooled through the regeneration cooling operation (the regeneration heating operation and the regeneration cooling operation are sequentially performed in the second tower).

Figure 7:
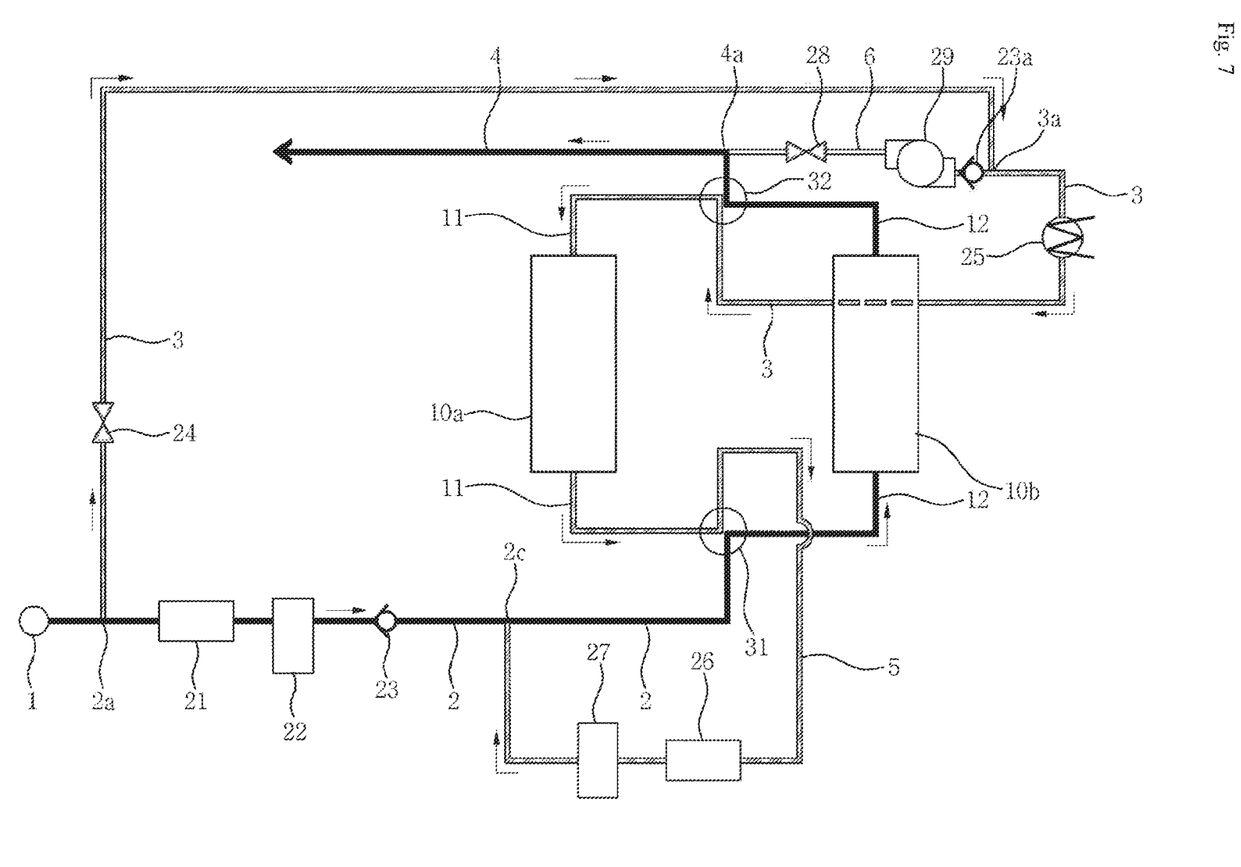
FIG. 7 is a view showing an operation state in which the dry air is generated in the second tower, and at the same time, the regeneration heating operation is performed in the first tower in the system according to the embodiment of the present invention.
Figure 8:
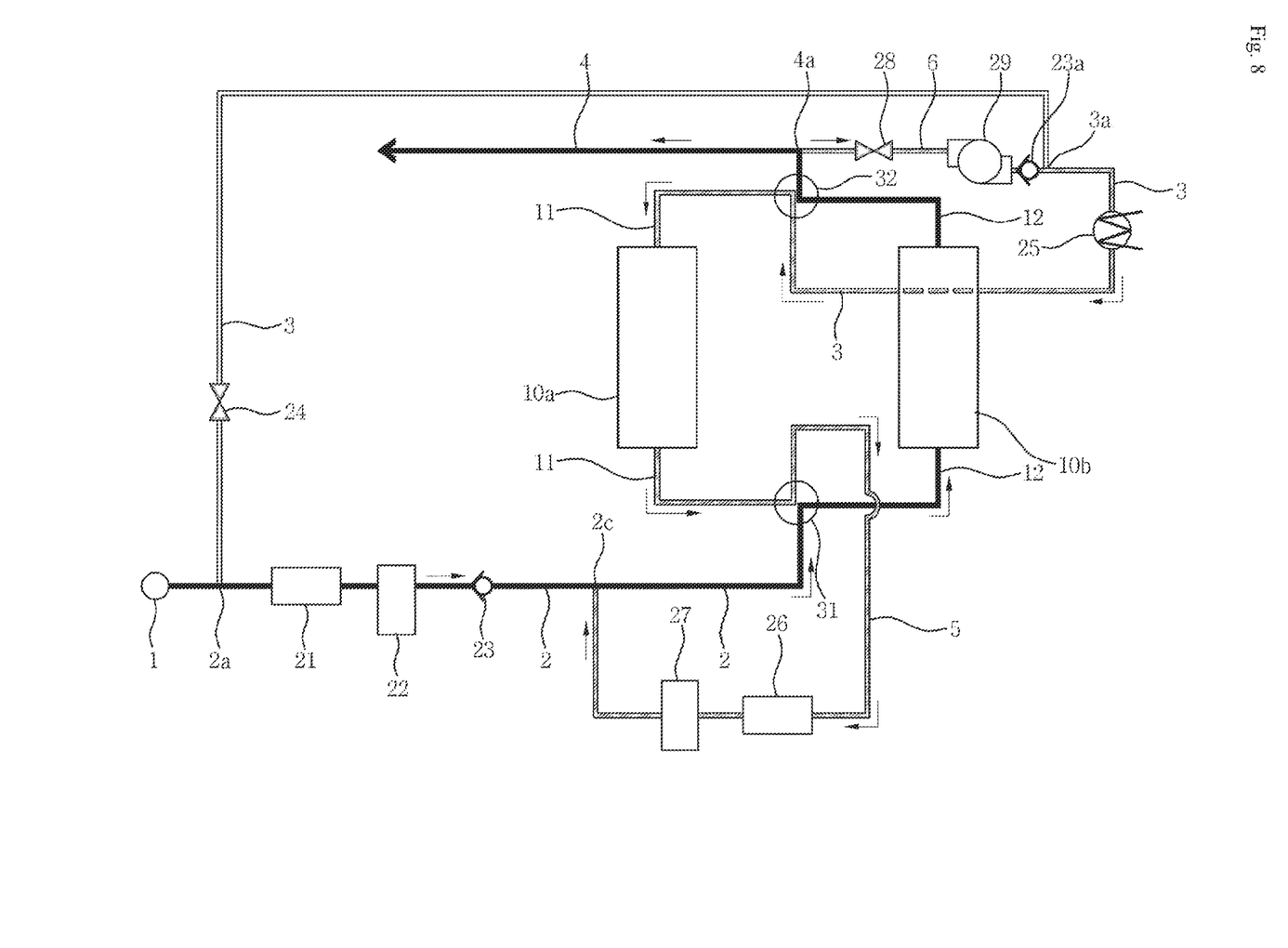
FIG. 8 is a view showing an operation state in which the dry air is generated in the second tower, and at the same time, the cooling operation is performed in the first tower in the system according to the embodiment of the present invention.

FIGS. 7 and 8 show the tower change. FIG. 7 is a view showing the operation state in which the dry air is generated in the second tower 10*b*, and at the same time, the regeneration heating operation is performed in the first tower 10*a*. FIG. 8 is a view showing the operation state in which the dry air is generated in the second tower 10*b*, and at the same time, the cooling operation is performed in the first tower 10*a*.

As shown in FIGS. 7 and 8, in the tower change state, the dry air is generated in the second tower 10*b*, and, here, the regeneration heating operation/regeneration cooling operation are sequentially performed in the first tower 10a.

As such, through the tower change, the generation of the dry air and the regeneration heating operation/regeneration cooling operation are selectively and alternately performed in the first tower 10a and the second tower 10b. The tower change and the sequential conversion of the regeneration heating operation/regeneration cooling operation in the regeneration tower are performed by the opening and closing control of the first and second valves 24 and 28, the selective control of the operations of the heater 25 and the blower 29, and the control of the operations (control of the flow path) of the 4-way valve 1 (31) and the 4-way valve 2 (32).

First, FIG. 5 shows the air flow path when the generation is performed in the first tower 10a and the regeneration (heating) is performed in the second tower 10b. Here, the first valve 24 is controlled to be in an open-state. The heater 25 is controlled to be in an on-state. The second valve 28 is controlled to be in a closed-state. The blower 29 is controlled to be in an off-state.

Also, in order that not only the first tower 10a is used as the generation tower but also the regeneration operation is performed in the second tower 10b (the regeneration heating operation and the regeneration cooling operation are sequentially performed), the 4-way valve 1 (31) is controlled to communicate both the main line 2 and the downstream first connection line 11 (connected to the bottom of the tower) of the first tower 10a with both the junction line 5 and the downstream second connection line 12 (connected to the bottom of the tower) of the second tower 10b. The 4-way valve 2 (32) is controlled to communicate both the discharge line 4 and the upstream first connection line 11 (connected to the top of the tower) of the first tower 10a with both the regeneration line 3 and the upstream second connection line 12 (connected to the top of the tower) of the second tower 10b.

Here, the generation of the dry air in the first tower 10a is performed in the bottom-up approach, and the air flow in the regeneration heating operation of the second tower 10b is performed in the top-down approach. The air flow in the below-described regeneration cooling operation of the second tower 10b of FIG. 6 is also performed in the top-down approach (the top-down approach is applied in both the regeneration heating operation and the regeneration cooling operation of the regeneration tower).

First, the high temperature (about 90 to 120° C.) compressed air which is supplied from the compressor 1 is distributed from the first branch point 2a to the main line 2 and the regeneration line 3 by an unshown flow rate control valve or an orifice. Here, a portion of the total air flow rate, for example, 5 to 30% of the total air flow rate is distributed to the regeneration line 3 and is used for the regeneration heating operation in the second tower 10b.

The compressed air supplied through the main line 2 is cooled by the first cooler 21 and the moisture of the air is removed through the first separator 22. Then, the air passes through the check valve 23 and the 4-way valve 1 (31) and is transferred to the downstream first connection line 11 (connected to the bottom of the tower) of the first tower 10a which is used as the generation tower. Then, the air is introduced into the first tower 10a through the downstream first connection line 11 and passes through the drying process by the moisture adsorption of the adsorbent in the first tower 10a.

Here, after the compressed air is cooled at a predetermined temperature, for example, a temperature of less than 40° C., the moisture of the compressed air is removed. Then, the air is introduced into the bottom of the first tower 10a and the moisture of the air is completely removed by contacting the adsorbent while passing through the first tower 10a. Thus, the air becomes dry.

Subsequently, the dry air which has flowed out from the top of the first tower 10a is discharged through the upstream first connection line 11 (connected to the top of the tower) of the first tower 10a and flows through the discharge line 4 from the 4-way valve 2 (32), and then is transferred to various demands through the discharge line 4.

Simultaneously with this, the compressed air distributed to the regeneration line 3 is heated at a temperature of about 120 to 250° C. while passing through the heater 25, and thus, is supplied with necessary heat. Then, the air heated at a high temperature is transferred to the upstream second connection line 12 (connected to the top of the tower) of the second tower 10b through the 4-way valve 2 (32) and is introduced into the top of the second tower 10b.

The air having a temperature which has risen to a target temperature required for the regeneration flows into the top of the second tower 10b and separates the moisture of the adsorbent charged within the tower, and then flows out through the bottom of the second tower 10b.

The high temperature and high humidity air which has flowed out from the second tower 10b is discharged to the downstream second connection line 12 (connected to the bottom of the tower) of the second tower 10b and flows through the junction line 5 via the 4-way valve 1 (31). Then, the air is cooled by the second cooler 26 and the moisture in the air is separated by the second separator 27 on the junction line 5. Subsequently, the air is joined at the junction 2c to the main line 2.

Consequently, the air which has passed through the regeneration heating operation in the second tower 10b is joined to new compressed air supplied from the compressor 1 to the first tower 10a through the main line 2, and then is used for generating the dry air in the first tower 10a.

As described above, when the regeneration heating operation of the second tower 10b is completed, the dry air is generated in the first tower 10a, and at the same time, the regeneration cooling operation is performed in the second tower 10b. FIG. 6 shows the air flow path when the generation is performed in the first tower 10a and the regeneration (cooling) is performed in the second tower 10b. Here, the first valve 24 is switched to be in a closed-state. The heater 25 is switched to be in an off-state. The second valve 28 is switched to be in an open-state. The blower 29 is switched to be in an on-state. The opening and closing states of the 4-way valve 1 (31) and the 4-way valve 2 (32) are maintained as they are.

A state where the generation operation is performed in the first tower 10a is the same as that described above. A portion of the dry air which has been discharged from the top of the first tower 10a through the upstream first connection line 11 (connected to the top of the tower) and then has been transferred to the discharge line 4 through the 4-way valve 2 (32) is distributed to the pressure-increase line 6 from the second branch point 4a.

Here, a portion of the total dry air flow rate, for example, 10% of the total dry air flow rate is distributed to the pressure-increase line 6 and is used for the regeneration cooling operation in the second tower 10b.

In other words, a portion of the dry air is inhaled and forcibly transmitted to the pressure-increase line 6 by the operation of the blower 29 in a state where the second valve 28 is in an open-state, and flows through the regeneration line 3 from the connection point 3a. Then, the portion of the dry air passes through the heater 25 in the off-state on the regeneration line 3 and is transferred to the upstream second connection line 12 (connected to the top of the tower) of the second tower 10b by the 4-way valve 2 (32).

The transferred dry air is introduced into the top of the second tower 10b and cools the heated second tower 10b during the regeneration heating operation and then is discharged from the bottom of the second tower 10b to the downstream second connection line 12 (connected to the bottom of the tower) of the second tower 10b. Then, the dry air flows through the junction line 5 from the 4-way valve 1 (31).

Subsequently, the air which has been used for cooling the second tower 10b is cooled by the second cooler 26 while flowing along the junction line 5, and at the same time, the moisture in the air is condensed by the second cooler 26. Then, the moisture is separated and removed by the second separator 27 and is joined at the junction 2c to the main line 2.

Consequently, the air which has passed through the regeneration cooling operation in the second tower 10b is joined to new compressed air supplied from the compressor 1 to the first tower 10a through the main line 2, and then is used for generating the dry air in the first tower 10a.

In this regeneration cooling operation of the second tower 10b, the blower 29 increases the pressure of the dry air inhaled from the discharge line 4 through the second branch point 4a on the pressure-increase line 6 to a predetermined pressure, for example, 0.1 to 0.2 bar, so that the air is forcibly transmitted to the regeneration line 3. The blower 29 compensates for the pressure loss generated during the non-purge operation, thereby allowing the operation to be smoothly performed regardless of the pressure change of the entire system.

Meanwhile, when the moisture absorption amount of the adsorbent in the first tower 10a reaches a certain level, the regeneration operation should be performed in the first tower 10a. For this, as shown in FIGS. 7 and 8, the tower change in which the regeneration operation is performed in the first tower 10a while the dry air is generated in the second tower 10b is made.

That is, the dry air generation operation and the regeneration operation are alternately changed in each of the towers 10a and 10b. The tower change is made by changing the flow path of each valve through the control of the operations of the two 4-way valves 31 and 32.

In order that not only the second tower 10b is used as the generation tower but also the regeneration operation is performed in the first tower 10a (the regeneration heating operation and the regeneration cooling operation are sequentially performed), the 4-way valve 1 (31) is controlled to communicate both the main line 2 and the downstream second connection line 12 (connected to the bottom of the tower) of the second tower 10b with both the junction line 5 and the downstream first connection line 11 (connected to the bottom of the tower) of the first tower 10a. The 4-way valve 2 (32) is controlled to communicate both the discharge line 4 and the upstream second connection line 12 (connected to the top of the tower) of the second tower 10b with both the regeneration line 3 and the upstream first connection line 11 (connected to the top of the tower) of the first tower 10a.

Here, the generation of the dry air in the second tower 10b is performed in the bottom-up approach, and the air flow in the regeneration heating operation of the first tower 10a is performed in the top-down approach. The air flow in the regeneration cooling operation of the first tower 10a is also performed in the top-down approach For example, in the operation states of FIGS. 5 to 8, the air flow is formed in the bottom-up approach in the generation tower, and is formed in the top-down approach in the regeneration tower.

FIG. 7 shows the air flow path when the generation is performed in the second tower 10b and the regeneration heating is performed in the first tower 10a. FIG. 8 shows the air flow path when the generation is performed in the second tower 10b and the cooling is performed in the first tower 10a.

The operation states of FIGS. 7 and 8 is only different from those of FIGS. 5 and 6 in that the operation states of the first tower 10a and the second tower 10b of FIGS. 7 and 8 are opposite to those of FIGS. 5 and 6 on the basis of the fact that the first tower 10a is the regeneration tower and the second tower 10b is the generation tower, the fact that the air is supplied to the second tower 10b through the main line 2 in accordance with the tower change and the dry air is discharged to the discharge line 4 from the second tower 10b, the fact that the air heated by the heater 25 of the regeneration line 3 is supplied to the first tower 10a and the air used for regenerating the adsorbent (separating the moisture from the adsorbent) in the first tower 10a is joined to the main line 2 through the junction line 5 and is used for generating the dry air, and the fact that the air which is forcibly transmitted by the blower 29 of the pressure-increase line 6 is supplied to the first tower 10a through the regeneration line 3 and the air used for cooling in the first tower 10a is joined to the main line 2 through the junction line 5 and is used for generating the dry air, etc. There is no difference in the basic procedures and principles of the generation operation and the regeneration heating operation/regeneration cooling operation.

That is, the compressed air which is supplied from the compressor 1 is distributed to the main line 2 and the regeneration line 3. The compressed air which is supplied through the main line 2 passes through both the first cooler 21 and the first separator 22 and both the check valve 23 and the 4-way valve 1 (31) and is transferred to the downstream second connection line 12 (connected to the bottom of the tower) of the second tower 10b which is used as the generation tower. Then, the air is introduced into the bottom of the second tower 10b through the downstream second connection line 12 and passes through the drying process by the moisture adsorption of the adsorbent in the second tower 10b.

Subsequently, the dry air which is discharged from the top of the second tower 10b is discharged through the upstream second connection line 12 (connected to the top of the tower) of the second tower 10b and flows through the discharge line 4 from the 4-way valve 2 (32), and then is transferred to various demands through the discharge line 4.

Simultaneously with this, the compressed air distributed to the regeneration line 3 is heated while passing through the heater 25, and thus, is supplied with heat required for regenerating the adsorbent (separating the moisture from the adsorbent). Then, the heated air is transferred to the upstream first connection line 11 (connected to the top of the tower) of the first tower 10a through the 4-way valve 2 (32) and is introduced into the top of the first tower 10a.

The air having a temperature which has risen to a target temperature required for the regeneration flows into the top of the first tower 10a and separates the moisture of the adsorbent within the tower. Then, the air is discharged to the downstream first connection line 11 (connected to the bottom of the tower) of the first tower 10a and flows through the junction line 5 via the 4-way valve 1 (31).

Subsequently, the air passes through the second cooler 26 and the second separator 27 on the junction line 5 and is joined at the junction 2c to the main line 2. The air is joined to new compressed air supplied from the compressor 1 to the second tower 10b through the main line 2, and then is used for generating the dry air in the second tower 10b.

As described above, when the regeneration heating operation of the first tower 10a is completed, the dry air is generated in the second tower 10b, and at the same time, the regeneration cooling operation is performed in the first tower 10a. A portion of the dry air discharged to the discharge line 4 through the upstream second connection line 12 (connected to the top of the tower) and the 4-way valve 2 (32) from the second tower 10b is distributed to the pressure-increase line 6 from the second branch point 4a.

In other words, a portion of the dry air is inhaled and forcibly transmitted to the pressure-increase line 6 by the operation of the blower 29 in a state where the second valve 28 is in an open-state, and flows through the regeneration line 3 from the connection point 3a. Then, the portion of the dry air passes through the heater 25 in the off-state on the regeneration line 3 and is transferred to the upstream first connection line 11 (connected to the top of the tower) of the first tower 10a by the 4-way valve 2 (32).

The transferred dry air is introduced into the top of the first tower 10a and cools the heated first tower 10a during the regeneration heating operation and then is discharged from the bottom of the first tower 10a to the downstream first connection line 11 (connected to the bottom of the tower) of the first tower 10a. Then, the dry air flows through the junction line 5 from the 4-way valve 1 (31).

Subsequently, the air which has been used for cooling the first tower 10a passes through the second cooler 26 and the second separator 27 while flowing along the junction line 5. Then the air is joined at the junction 2c to new compressed air of the main line 2, and then is used for generating the dry air in the second tower 10b.

Up to now, the embodiment of the present invention has been described in detail. The right scope of the present invention is not limited to the described embodiment and various changes and improvements made by those skilled in the art by using the basic concepts of the present invention defined by the appended claims are also included in the right scope of the present invention.

REFERENCE NUMERAL

| | |
|---|---|
| 1: compressor | 2: main line |
| 2a: first branch point | 2c: junction |
| 3: regeneration line | 3a: connection point |
| 4: discharge line | 4a: second branch point |
| 5: junction line | 6: pressure-increase line |
| 10a: first tower | 10b: second tower |
| 11: first connection line | 12: second connection line |
| 21: first cooler | 22: first separator |
| 23: check valve | 24: first valve |
| 25: heater | 26: second cooler |
| 27: second separator | 28: second valve |
| 29: blower | 31: 4-way valve 1 |
| 32: 4-way valve 2 | |

What is claimed is:

1. An adsorption air drying system with a non-purge operation using compressed heat, the system comprising:

a first tower and a second tower in which an adsorbent is built;

a main line for supplying compressed air supplied from a compressor to each of the towers;

a regeneration line which is branched off from the main line and in which the compressed air for regenerating the adsorbent by each of the towers is distributed and flows;

a first connection line which is for air inlet/outlet allowing the air to pass through the first tower and is connected to one and the other sides of the first tower;

a second connection line which is for air inlet/outlet allowing the air to pass through the second tower and is connected to one and the other sides of the second tower;

a discharge line through which dry air where moisture has been adsorbed by the adsorbent in the tower is discharged;

a junction line which is connected to the main line and causes the air which has passed through an adsorbent regeneration operation or a tower cooling operation in the tower where the adsorbent has been regenerated to be joined to the main line;

a pressure-increase line which is branched off from the discharge line and is connected to the regeneration line;

a blower which is installed on the pressure-increase line and forcibly transmits the dry air of the discharge line to the regeneration line;

a 4-way valve 1 for selectively connecting the main line, the first connection line and the second connection line which are connected to one side of each of the towers, and the junction line; and a 4-way valve 2 for selectively connecting the first connection line and the second connection line which are connected to the other side of each of the towers, the regeneration line, and the discharge line.

2. The adsorption air drying system according to claim 1, wherein a first cooler for cooling the air and a first separator for separating and removing the moisture in the air are sequentially installed on the main line.

3. The adsorption air drying system according to claim 1, wherein a second cooler for cooling the air and a second separator for separating and removing the moisture in the air are sequentially installed on the junction line.

4. The adsorption air drying system according to claim 1, wherein a valve for controlling the air flow is installed on the pressure-increase line.

5. The adsorption air drying system according to claim 1, wherein a heater which heats the compressed air for regenerating the adsorbent is installed on the regeneration line.

6. The adsorption air drying system according to claim 1, wherein the compressed air which flows through the regeneration line and the dry air which is forcibly transmitted to the regeneration line through the pressure-increase line are sequentially supplied through the 4-way valve 2 to the tower where the regeneration operation is performed, so that the adsorbent regeneration heating operation and the tower cooling operation are sequentially performed in the tower.

7. The adsorption air drying system according to claim 1, wherein the main line and the discharge line are connected to air inlet/outlet connection lines of one of the first tower and the second tower by the 4-way valve 1 and the 4-way valve 2, and the junction line and the regeneration line are connected to air inlet/outlet connection lines of the other of the first tower and the second tower by the 4-way valve 1 and the 4-way valve 2, so that the dry air is generated in one of the two towers and the adsorbent regeneration heating operation and the tower cooling operation are performed in the other tower.

8. The adsorption air drying system according to claim 7, wherein the first connection line and the second connection line which are connected to the bottom of each of the towers are selectively connected to the main line and the junction line by the 4-way valve 1, and the first connection line and the second connection line which are connected to the top of each of the towers are selectively connected to the regeneration line and the discharge line by the 4-way valve 2, so that when the dry air is generated, the air flow is performed in a bottom-up approach in the tower, and when the adsorbent regeneration heating operation and the tower cooling operation are performed, the air flow is performed in a top-down approach in the tower.

9. The adsorption air drying system according to claim 2, wherein the compressed air which flows through the regeneration line and the dry air which is forcibly transmitted to the regeneration line through the pressure-increase line are sequentially supplied through the 4-way valve 2 to the tower where the regeneration operation is performed, so that the adsorbent regeneration heating operation and the tower cooling operation are sequentially performed in the tower.

10. The adsorption air drying system according to claim 3, wherein the compressed air which flows through the regeneration line and the dry air which is forcibly transmitted to the regeneration line through the pressure-increase line are sequentially supplied through the 4-way valve 2 to the tower where the regeneration operation is performed, so that the adsorbent regeneration heating operation and the tower cooling operation are sequentially performed in the tower.

11. The adsorption air drying system according to claim 4, wherein the compressed air which flows through the regeneration line and the dry air which is forcibly transmitted to the regeneration line through the pressure-increase line are sequentially supplied through the 4-way valve 2 to the tower where the regeneration operation is performed, so that the adsorbent regeneration heating operation and the tower cooling operation are sequentially performed in the tower.

12. The adsorption air drying system according to claim 5, wherein the compressed air which flows through the regeneration line and the dry air which is forcibly transmitted to the regeneration line through the pressure-increase line are sequentially supplied through the 4-way valve 2 to the tower where the regeneration operation is performed, so that the adsorbent regeneration heating operation and the tower cooling operation are sequentially performed in the tower.

13. The adsorption air drying system according to claim 2, wherein the main line and the discharge line are connected to air inlet/outlet connection lines of one of the first tower and the second tower by the 4-way valve 1 and the 4-way valve 2, and the junction line and the regeneration line are connected to air inlet/outlet connection lines of the other of the first tower and the second tower by the 4-way valve 1 and the 4-way valve 2, so that the dry air is generated in one of the two towers and the adsorbent regeneration heating operation and the tower cooling operation are performed in the other tower.

14. The adsorption air drying system according to claim 3, wherein the main line and the discharge line are connected to air inlet/outlet connection lines of one of the first tower and the second tower by the 4-way valve 1 and the 4-way valve 2, and the junction line and the regeneration line are connected to air inlet/outlet connection lines of the other of the first tower and the second tower by the 4-way valve 1 and the 4-way valve 2, so that the dry air is generated in one of the two towers and the adsorbent regeneration heating operation and the tower cooling operation are performed in the other tower.

15. The adsorption air drying system according to claim 4, wherein the main line and the discharge line are connected to air inlet/outlet connection lines of one of the first tower and the second tower by the 4-way valve 1 and the 4-way valve 2, and the junction line and the regeneration line are connected to air inlet/outlet connection lines of the other of the first tower and the second tower by the 4-way valve 1 and the 4-way valve 2, so that the dry air is generated in one of the two towers and the adsorbent regeneration heating operation and the tower cooling operation are performed in the other tower.

16. The adsorption air drying system according to claim 5, wherein the main line and the discharge line are connected to air inlet/outlet connection lines of one of the first tower and the second tower by the 4-way valve 1 and the 4-way valve 2, and the junction line and the regeneration line are connected to air inlet/outlet connection lines of the other of the first tower and the second tower by the 4-way valve 1 and the 4-way valve 2, so that the dry air is generated in one of the two towers and the adsorbent regeneration heating operation and the tower cooling operation are performed in the other tower.

* * * * *